United States Patent
Reershemius

(10) Patent No.: US 11,701,716 B2
(45) Date of Patent: Jul. 18, 2023

(54) APPARATUS FOR HOLDING AND RELEASING WITH ROD-SHAPED RELEASE ELEMENTS MADE OF A SHAPE MEMORY ALLOY

(71) Applicant: Deutsches Zentrum fuer Luft- und Raumfahrt e.V., Bonn (DE)

(72) Inventor: Siebo Reershemius, Vechta (DE)

(73) Assignee: DEUTSCHES ZENTRUM FUR LUFT-UND RAUMFAHRT E.V., Bonn (DE)

( * ) Notice: Subject to any disclaimer, the term of this patent is extended or adjusted under 35 U.S.C. 154(b) by 337 days.

(21) Appl. No.: 17/208,054

(22) Filed: Mar. 22, 2021

(65) Prior Publication Data
US 2021/0293225 A1 Sep. 23, 2021

(30) Foreign Application Priority Data
Mar. 23, 2020 (DE) ...................... 10 2020 107 936.2

(51) Int. Cl.
*B23B 31/20* (2006.01)
*F16B 1/00* (2006.01)
(Continued)

(52) U.S. Cl.
CPC ...... *B23B 31/20125* (2021.01); *F03G 7/0614* (2021.08); *F03G 7/0631* (2021.08);
(Continued)

(58) Field of Classification Search
CPC . B23B 31/20125; B23B 31/20; B23B 31/201; B23B 2228/16; Y10T 279/17538;
(Continued)

(56) References Cited

U.S. PATENT DOCUMENTS 3,995,534 A 12/1976 Rastetter
5,771,742 A 6/1998 Bokaie
(Continued)

FOREIGN PATENT DOCUMENTS

DE 2333491 A1 1/1975
DE 102009041907 A1 4/2011
(Continued)

OTHER PUBLICATIONS

Hoffmann Group: ER collet ER 11; https://www.hoffmann-group.com/US/en/hus/Clamping-technology/Toolholders/ER-collet-ER-11/p/308881.

*Primary Examiner* — Sunil K Singh
*Assistant Examiner* — Reinaldo A Vargas Del Rio
(74) *Attorney, Agent, or Firm* — Thomas | Horstemeyer, LLP

(57) ABSTRACT

An apparatus for holding and releasing a pin in a controlled manner comprises a base, a pin holding element supported at the base, a plurality of rod-shaped release elements made of a shape memory alloy and supported at the base, a holding force application device supported at the base for applying an elastic holding force, and a force transfer element. The force transfer element is subjected to the elastic holding force and, against the elastic holding force, supported at the base via a parallel arrangement of the pin holding element and the release elements. The release elements are arranged with radial play in blind holes in the base, which are arranged around the pin holding element. The pin holding element is deactivatable by heating up the release elements beyond a transition temperature of their shape memory alloy and by a resulting recovery of the release elements to straight memory shapes.

19 Claims, 3 Drawing Sheets

(51) Int. Cl.
*F03G 7/06* (2006.01)
*B64G 1/22* (2006.01)

(52) U.S. Cl.
CPC ........ *F16B 1/0014* (2013.01); *B23B 2228/16* (2013.01); *B64G 1/222* (2013.01); *Y10T 279/17538* (2015.01)

(58) Field of Classification Search
CPC ........... Y10T 279/17299; F16B 1/0014; F03G 7/0614; F03G 7/0631
See application file for complete search history.

(56) References Cited

U.S. PATENT DOCUMENTS

| | | | | |
|---|---|---|---|---|
| 6,715,591 | B2 * | 4/2004 | Davis | F16F 9/56 |
| | | | | 188/266.2 |
| 7,422,403 | B1 | 9/2008 | Johnson | |

FOREIGN PATENT DOCUMENTS

| | | | | |
|---|---|---|---|---|
| EP | 2299141 | A2 | | 3/2011 |
| JP | 62199306 | A | * | 9/1987 |
| KR | 20140080147 | A | * | 6/2014 |
| WO | WO-2008015454 | A1 | * | 2/2008 ........... B23B 31/207 |

* cited by examiner

APPARATUS FOR HOLDING AND RELEASING WITH ROD-SHAPED RELEASE ELEMENTS MADE OF A SHAPE MEMORY ALLOY

CROSS REFERENCE TO RELATED APPLICATIONS

This present invention claims priority to German Patent Application No. DE 10 2020 107 936.2 filed on Mar. 23, 2020, entitled "Vorrichtung zum Halten und kontrollierten Freigeben mit mindestens einem Element aus einer Formgadächtnislegierung".

FIELD OF THE INVENTION

The present invention relates to an apparatus for holding and releasing a pin in a controlled manner. More particular, the present invention relates to such an apparatus comprising a base, a holding element for the pin supported at the base, and release elements made of a shape memory alloy, which are also supported at the base, wherein the holding element is deactivatable by heating up the release elements beyond a transition temperature of their shape memory alloy and by a resulting recovery of the release elements to a memory shape.

For example, the apparatus may be provided at a space craft for releasing a device which is fixed to the space craft via the pin by means of releasing the pin. The device may be released to fully separate the device from the space craft or to unfold the device. Particularly, a solar panel or any other large area structure may be unfolded at the space craft by releasing an elastically pre-loaded component.

BACKGROUND OF THE INVENTION

U.S. Pat. No. 5,771,742 discloses a release mechanism employing an actuating element made of a shape memory alloy material. When the actuating element is heated through its phase-change transition temperature it applies a force which removes a latch to a position which activates a higher energy stored in a drive spring for moving a retaining element out of engagement with a structure. A detent when in a captured position releasably holds a retaining element in its locked position, and the detent is moved from a captured position to a retracted position to release the retaining element when the latch is moved by the actuating element. The actuating element is a wire which recovers to a memory shape by contraction of the wire when heated through its phase-change transition temperature.

U.S. Pat. No. 7,422,403 discloses a device for holding or clamping components together. The clamping is selectively loosened to permit the components to move through a predetermined distance without being fully released. A bolt has its head end attached to one component and is threaded end attached to the other component. A portion of the bolt's shank is formed with a necked down portion. An actuator made of a shaped memory alloy material is mounted about the bolt. When energized by heat, the actuator expands and exerts a great force which stretches the bolt, permanently deforming the bolt. This enables limited movement of the components while still restraining from separating.

The product "Frangibolt" of the company TiNi Aerospace, Inc., USA is based on a similar principle as disclosed by U.S. Pat. No. 7,422,403. In the product Frangibolt, a bolt which is screwed with its one end into a structure to be released, which extends through an actuator made of a shape memory alloy and whose head abuts against the actuator at its end opposing the structure to be released is broken in a prepared area of its shaft by means of an expansion of the actuator. The shape memory alloy of the actuator has a one way memory effect. Prior to being re-used, the actuator has to be mechanically reset into its shorter starting shape. The bolt made of a titanium alloy is destroyed when releasing the structure, i.e. it is provided for one time use only. It is a further disadvantage that high elastic forces are set free at once when the bolt breaks. These high elastic forces may result in undesired movements of the released structure.

German patent 10 2009 041 907 and European patent 2 299 141 belonging to the same patent family disclose a braking and clamping apparatus comprising a housing which surrounds a guide rail. The housing comprises frictional restraining mechanisms which are each actuatable via a shifting-wedge-type transmission and include a friction jaw adapted to be urged against the guide rail as a part of a resilient clamping sleeve. The shifting-wedge-type transmissions are driven in a loading direction and in a relieve direction for loading and relieving said frictional restraining mechanisms by an actuating member and by spring storage means. A central body is longitudinally displaceable within the housing. Parts of the shifting-wedged-type transmissions are mounted to the central body, and the central body radially supports clamping forces of the shifting-wedged-type transmissions. Parts of the spring storage means are mounted to one longitudinal end of the central body, and the actuating member which may be made of a shape memory alloy, is arranged at the other longitudinal end of the central body.

German patent 23 33 491 and U.S. Pat. No. 3,995,534 belonging to the same patent family disclose a safety arrestor for arresting a hydraulically operated lifting ram of a hydraulic elevator. The safety arrestor comprises an arrestor body, within which a plurality of brake shoes are located. The brake shoes are segments of a ring around a passage through the arrestor body for receiving the ram. The brake shoes are spring biased into frictional engagement with the ram, and they are displaceable out of engagement with the ram by hydraulic actuator means. Springs biasing the brake shoes are arranged at one longitudinal end thereof, and the hydraulic actuator means are arranged at an opposite longitudinal end thereof.

There still is a need of an apparatus for holding an releasing a pin which without efforts is completely suited for repeated use, which releases the bolt without setting free high forces and which is of a cost-effective construction at the same time.

SUMMARY OF THE INVENTION

The present invention relates to an apparatus for holding and releasing a pin in a controlled manner. The apparatus comprises a base, a pin holding element supported at the base, a plurality of rod-shaped release elements made of a shape memory alloy and supported at the base, a holding force application device supported at the base and configured for applying an elastic holding force, and a force transfer element. The force transfer element is subjected to the elastic holding force applied by the holding force application device, and the force transfer element, against the elastic holding force, is supported at the base via a parallel arrangement of the pin holding element and the rod-shaped release elements. Each of the rod-shaped release elements is arranged with radial play in a blind hole of a plurality of blind holes in the base, the plurality of blind holes being arranged around the pin holding element. The pin holding element is deactivatable by heating up the rod-shaped release elements beyond a transition temperature of their shape memory alloy and by a resulting recovery of the rod-shaped release elements to straight memory shapes.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
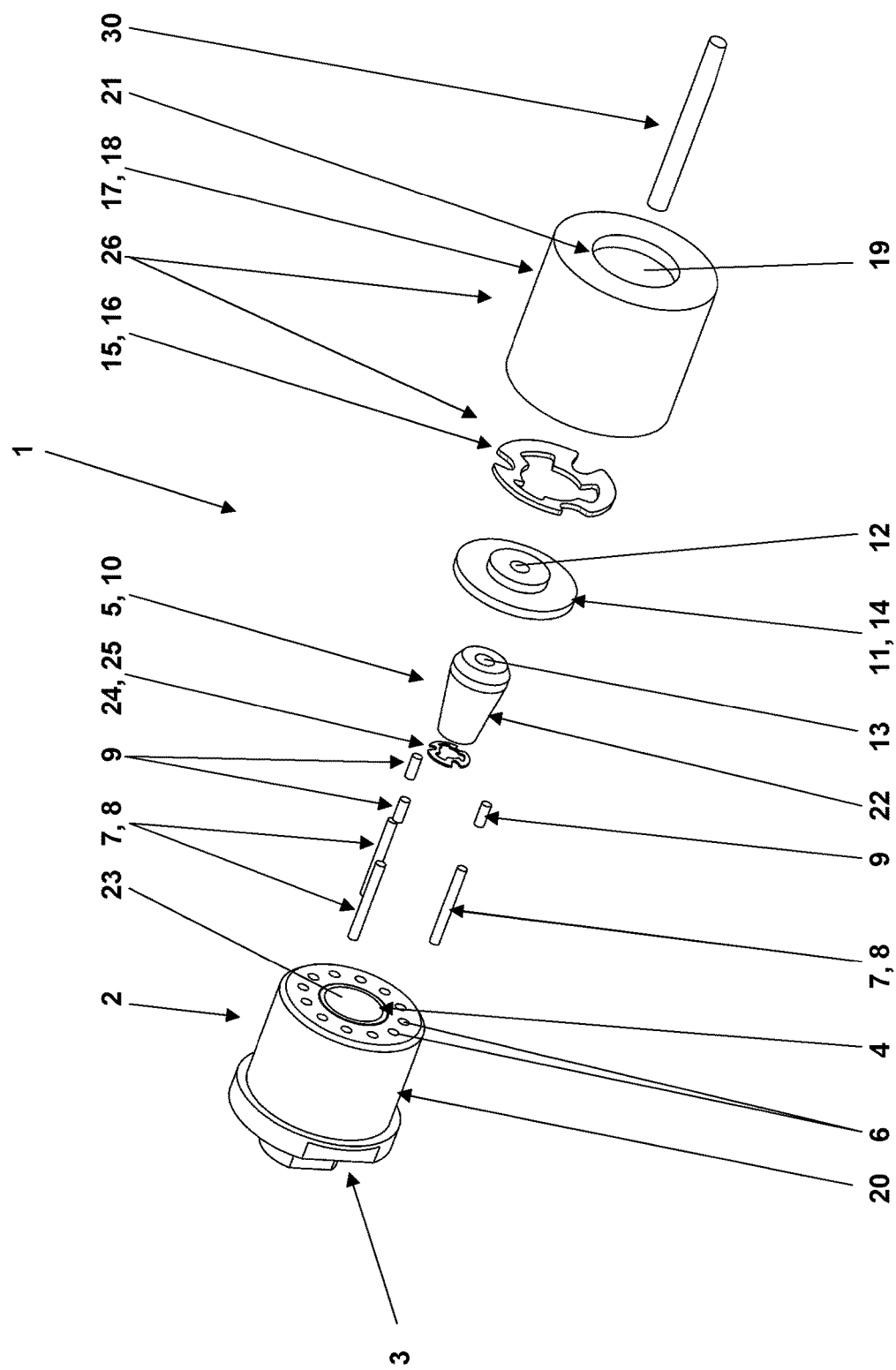
FIG. 1 is an exploded view of an apparatus according to the invention.

In an apparatus according to the invention for holding and releasing a pin in a controlled manner, the apparatus comprising a base, a pin holding element for the pin supported at the base, and rod-shaped release elements made of a shape memory alloy and also supported at the base. The pin holding element is deactivatable by heating up the rod-shaped release elements beyond a transition temperature of the shape memory alloy and a resulting recovery of the rod-shaped release elements to their memory shapes. The apparatus further comprises a holding force application device supported at the base, and a force transfer element which is, on the one hand, subjected to an elastic holding force by the holding force application device and, on the other hand, supported at the base against the holding force via a parallel arrangement of the pin holding element and the rod-shaped release elements. The rod-shaped release elements are arranged around the pin holding element, and, in the flux of the holding force, they are all connected in parallel to the pin holding element. Each of the rod-shaped release elements made of the shape memory alloy is arranged in a blind hole in the base with radial play. The blind holes are arranged around the pin holding element.

The pin holding element holds the pin when the pin holding element is subjected to the holding force between the force transfer element and the base. The rod-shaped release elements arranged in parallel to the pin holding element between the force transfer element and the base are also subjected to the holding force. However, below the transition temperature of the shape memory alloy, the rod-shaped release elements only bear a small part of the holding force which does not affect the holding of the pin by the pin holding element due to the holding force. In fact, the holding force, so far as acting upon and supported by the release elements, results in an essentially plastic deformation of the memory shapes of the rod-shaped release elements. When heating up the rod-shaped release elements beyond the transition temperature of their shape memory alloy, the rod-shaped release elements return or recover to their straight memory shapes and then subject the force transfer element to a high return or reset force. Such a high return or reset force is typical for shape memory alloys. A resulting movement of the force transfer element against the elastic holding force of the holding force application device results in that the holding force is no longer supported at the base via the pin holding element but via the release elements. Once relieved in this ways, the pin holding element releases the pin. After cooling of the rod-shaped release elements down below the transition temperature of their shape memory alloy, the rod-shaped release elements are once again deformed by the holding force. Thus, the holding force is once again essentially supported by the pin holding element so that the pin holding element can once again hold the pin. For holding the pin again, it is sufficient to re-insert the pin into the apparatus prior to cooling the rod-shaped release elements down. It is also possible to once again heat up the rod-shaped release elements for re-inserting the pin, if the rod-shaped release elements already cooled down below the transition temperature of their shape memory alloy and no longer support the holding force. It is not necessary to mechanically set back the apparatus. The pin may also be re-used.

A simple shape memory alloy displaying a one way memory effect is sufficient for making the rod-shaped release elements. The shape memory alloy is to be selected from available shape memory alloys such that its transition temperature fits to the intended use of the apparatus. The transition temperature of the shape memory alloy should only by exceeded or even reached by purposefully heating up the rod-shaped release elements but not by changes of temperature of the rod-shaped release elements occurring for other reasons in the use of the apparatus. The bandwidth of available shape memory alloys and their transition temperature is huge. Often used shape memory alloys essentially consisting of nickel and titanium display transition temperatures in a range from 70° C. to 100° C. However, shape memory alloys with a higher transition temperature of even above 200° C. are also known. They may, for example, be based on copper or iron. Such shape memory alloys may also be used in the apparatus. In any case, the transition temperature of the shape memory alloy should be clearly above usual room, environmental and transport temperature and thus be at least 70° C. There is no absolute upper limit for the transition temperature of the shape memory alloy to be used in the apparatus as long as a shape memory alloy having this transition temperature is available and as long as the other components of the apparatus are stable at and above this transition temperature.

In one embodiment, the rod-shaped release elements connected in parallel to one another and to the pin holding element are equal to one another and uniformly distributed in a circle around the pin holding element. As the release elements are rod-shape, they have an extremely simple shape. The rods are arranged with radial play in the blind holes in the socket. Below the transition temperature of the shape memory alloy, the rods are deformed in the blind holes by the holding force out of their typically straight memory shape into a curved shape. When being heated up beyond the transition temperature, the rods straighten, i. e. they return to their straight memory shape.

In the practical application of the apparatus it has been proven to be advantageous, if a force transfer piece guided within one of the blind holes is connected between the force transfer element and the rod-shaped release element arranged in the respective blind hole. When using these force transfer elements, it is not necessary that the release elements protrude out of the blind holes, and thus there is no danger that the release elements are deformed outside the blind holes by the holding force in an uncontrolled way.

In an embodiment of the apparatus, the blind holes for receiving the rod-shaped release elements are parallel to the pin held by the pin holding element. In the use of the apparatus, some blind holes in the socket may be left free, if a sufficient return or reset force is exerted onto the force transfer element when exceeding the transition temperature of the shape memory alloy already with a lower number of release elements than the total number of the blind holes. However, it is to be understood that the release elements present are preferably provided in a rotationally symmetric arrangement around the pin holding element and the pin held by it, respectively.

The total radial play of the release elements in the blind holes may be in a typical range from 5% to 15%, i.e. about 10% of the diameter of the rod-shaped release elements. This particularly applies to rod-shaped release elements of circular or square cross section. The diameter of the circular or square blind holes is then by about 10% larger than the diameter of the rod-shaped release elements.

The pin holding element may receive the pin in a central pin seat. The pin holding element may be a collet chuck having such a central pin seat for the pin. Typically, the collet chuck is slotted, and it may have an outer cone via which the collet chuck is supported at an inner cone of the base and thus radially compressed towards the pin due to the holding force supported at the base. Cone angles of the outer cone of the collet chuck and the inner cone of the base are preferably equal to realize a two dimensional mutual support. These cone angles may be in a range from 10° and 20° as it is usual for collet chucks in mechanical engineering. It is to be understood that the outer cone of the collet chuck and the inner cone of the base have to have sufficiently hard and smooth surfaces to avoid seizing of the collet chuck in the base.

If the rod-shaped release elements take the holding force over, the collet chuck, with its outer cone, has to move a little out of the inner cone of the base to release the pin. This movement is generally already caused by the elasticity of the collet chuck but it may be assisted by a releasing spring via which the collet chuck is additionally axially supported at the base. A separating or gliding agent applied to the outer cone of the collet chuck or the inner cone of the base or suitable coatings of the outer cone of the collet cuck and the inner cone of the base may also be helpful for a direct release of the pin upon the rod-shaped release elements taking the holding force over.

The holding force application device of the apparatus may, for example, have a screw element with a thread that may be screwed in or on a counter-thread provided at the base. A thread axis of the counter-thread may be parallel or even coaxial to the pin held by the pin holding element. Further, the screw element may be a screw cap which can be screwed on a counter thread of the socket. This screw cap may have a central opening for the pin. Instead of a screw cap or other screw elements, the holding force application device may have any other element for applying the holding force or for only supporting the holding force at the base. However, as a rule, the holding force application device has a spring to provide for the elasticity of the holding force. This spring may, for example, comprise at least one cup spring or more particular a clover-leaf-shaped cup spring or a stack of such cup springs. The term clover-leaf-shaped cup springs refers to such cup springs as they are described in U.S. Pat. No. 6,705,813 and which provide for a spring characteristic which is suitable for the elastic holding force.

The force transfer element of the apparatus may be a simple punched disc or washer having a central opening for the pin and directly subjected to the elastic holding force by the cup spring or the stack of cup springs.

A heating device for heating the release elements may be part of the apparatus, i.e. include a heating cartridge arranged within the socket, for example. Further, it is also possible to arrange a heating device for heating the release elements around the base of the apparatus. Thus, the heating device may be a unit which is, in principle, separate from the further components of the apparatus.

In one embodiment, the heating device is configured to directly heat up each of the rod-shaped release elements in that it directs an electric current through the respective release element. Generally, the release elements may be directly heated up by an electric current coming from any power source available. However, very high currents are needed to heat the shape memory alloy in short time up beyond its transition temperature. These currents may easily exceed 10A. If a space craft can not directly supply such a high current, the heating device may include a boost converter which provides this high current using a smaller input current at a higher voltage. Such a boost converter may be used for charging a storage capacitor which provides a high short circuit current when discharged via the rod-shaped release elements.

For purposefully leading the electric current through the rod-shaped release elements arranged in the blind holes, electrical insulations may be provided at the outer circumferences of the rods and/or at the inner circumferences of the blind holes. This electrical insulations may be provided by applying an insulating lacquer.

Now referring in greater detail to the drawings, the apparatus 1 depicted in an exploded view in FIG. 1 serves for holding and releasing a pin 30 in a controlled manner. The apparatus 1 comprises a base 2. At its backside 3, the base 2 is provided with fixation means for fixing the base 2 to a structure of a space craft, for example. At its front side, the base has a location opening 4 for a pin holding element 5 for the pin 30 and a ring of blind holes 6. Each of the blind holes 6 is configured for receiving a rod 7 made of a shape memory alloy and for partially receiving a force transfer piece 9 on top of the rod 7. The rods 7 serve as release elements 8. In the FIG. 1, three rods 7 and three associated force transfer pieces 9 are shown, whereas the total number of the blind holes 6 is twelve. This is an indication that not all blind holes 6 have to be occupied by rods 7 and force transfer pieces 9. The pin holding element 5 is a collet chuck 10. A punched hole or washer 11 abuts against the front ends of the force transfer pieces 9 and of the collet chuck 10. The washer 11 has a central opening 12 for inserting the pin 30 in a pin seat 13 of the collet chuck 10. The washer 11 serves as a force transfer element 14. Via a spring 15 which is made as a clover-leaf-shaped cup spring 16 here, the force transfer element 14 is subjected to an elastic holding force, when a screw cap 17 serving as a screw element 18 and having an inner thread 19 is screwed on a counter-thread 20 provided at an outer circumference of the base 2. The screw cap 17 has a central opening 21 for the pin 30. The holding force applied by screwing the screw cap 17 on the socket 2 and transferred via the cup spring 16 onto the force transfer element 14 is supported at the base 2 via a parallel arrangement or connection of the pin holding element 5 and the release elements 8. Below a transition temperature of the shape memory alloy of the release elements 8, the holding force is essentially supported ore borne by the pin holding element 5, i.e. by the collet chuck 10 which is supported via an outer cone 22 at an inner cone 23 of the location opening 4 of the base 2 and thus elastically compressed towards the pin 30 located in its pin seat 13. Thus, a radial clamping force is exerted onto the pin 2. The axial resultant of this clamping force supports the essential parts of the axial holding force. Smaller parts of the holding force which are exerted by the force transfer element 17 via the force transfer pieces 9 on the release elements 8 result in a plastic deformation of the rods 7 within the blind holes 6 whose inner diameters are larger than outer diameters of the rods 7. Below the transition temperature of the shape memory alloy of the release elements 8, the release elements 8 do not provide an essential counter-force to this deformation. In other words, the rods 7 are compressed between their ends within the blind holes 6 by the holding force without providing a relevant counter-force to the holding force.

The distribution of the support of the elastic holding force onto the collet chuck 10 and the rods 7 made of the shape memory alloy connected in parallel to the collet chuck 10 changes, when the release elements 8 are heated up by a heating device beyond the transition temperature of their shape memory alloy. Then, the rods 7 return or recover to their straight memory shape and provide a high return or reset force. This return force is transferred via the force transfer pieces 9 to the force transfer element 14 and presses the force transfer element 14 away from the collet chuck 10. As a result, the collet chuck 10 moves out of the location opening 4 in the socket 2 to such an extent that the elastic collet chuck 10 opens and releases the bolt 30 out of its pin seat 13. This movement of the collet chuck 10 is assisted by a release spring 24 which is a further clover-leaf-shaped cup spring 25 here and which urges the collet chuck 10 out of the location opening 4 in the socket 2 so that the outer cone 22 gets free from the inner cone 23.

This entire process is reversible. If the release elements 8 cool down below the transition temperature of their shape memory alloy, they are deformed again by the holding force within the blind holes 6. If the pin 30 has been re-introduced in the pin seat 13 prior to that, it is once again held or clamped by the collet chuck 10. Otherwise, the release elements 8 have just to be re-heated for re-introducing the pin 30 in the pin seat 13 of the collet chuck 10.

A holding force application device 26 which here consists of the screw cap 17 and the spring 15 may alternatively be designed in another way. However, as a rule, it comprises a spring 15 to apply the elastic holding force on the force transfer element 14.

Figure 2:
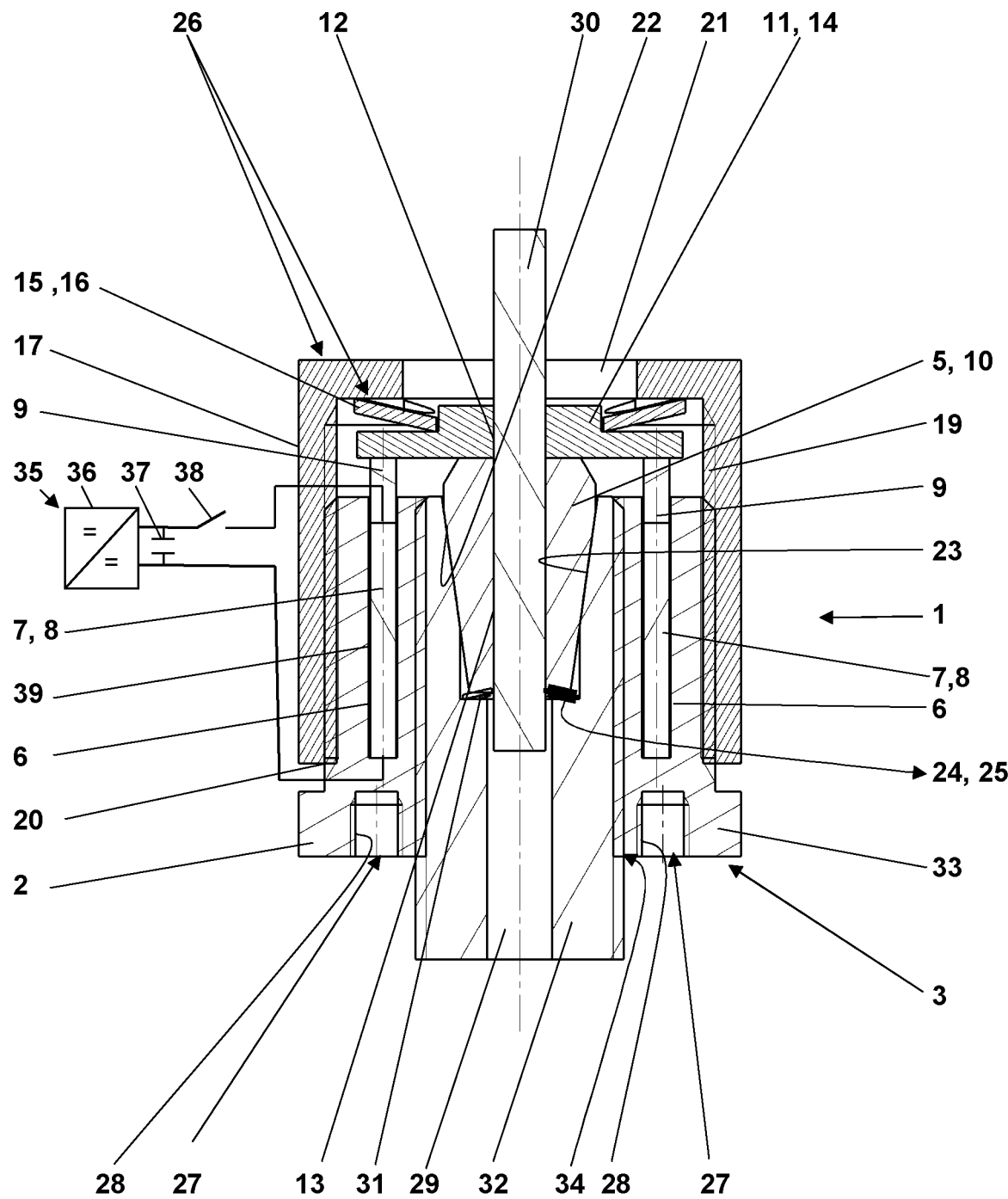
FIG. 2 is a longitudinal section through the apparatus according to the invention of FIG. 1 in an assembled state, in which an additional heating device is schematically depicted.

The longitudinal section according to FIG. 2 shows fixation holes 17 with internal threads 28 provided as fixation means at the backside 3 of the base 2. Further, it can be seen from FIG. 2 that the base 2 is provided with a through hole 29 which has a step 31 for supporting the release spring 24. The through hole 29 and the location opening 4 for the collet chuck 10 are provided in an inner base 32 here, which, via a threaded connection 34, is axially adjustable with regard to an outer base 33 in which the blind holes 6 are provided. Via this optional axial adjustability, the axial relative position of the release elements 8 with regard to the holding element 5 and thus the distribution of the holding force between the release elements 8 and the pin holding element 5 is adjustable. Further, FIG. 2 shows rods 7 in both blind holes 6 sectioned. This corresponds to a higher total number of the release elements 8 than three. Even Further, FIG. 2 schematically depicts an exemplary embodiment of the heating device 35 for the release elements 8. The heating device 35 comprises a boost converter 36 for charging a high capacitance storage capacitor 37. When a switch 38 is closed, the storage capacitor is discharged via the rods 7. With the rather low ohmic resistances of the rods 7, the resulting high short circuit currents flowing through the rods 7 heat them up above the transition temperature of their shape memory alloy within very short time. Electrical insulations 39 provided at outer circumferences of the rods 7 and at inner circumferences of the blind holes 6 ensure that the short circuit current indeed flows through the rods 7 and not through the base 3.

Even from FIG. 2 it cannot be seen that the collet chuck 10 in practical applications of the apparatus 1 will normally be slotted and that the measure by which the diameters of the blind holes 6 are larger than the diameters of the rods 7, i.e. the total radial play of the rods 7 in the blind holes 6 is about 10% of the diameter of the rods 7.

Figure 3:
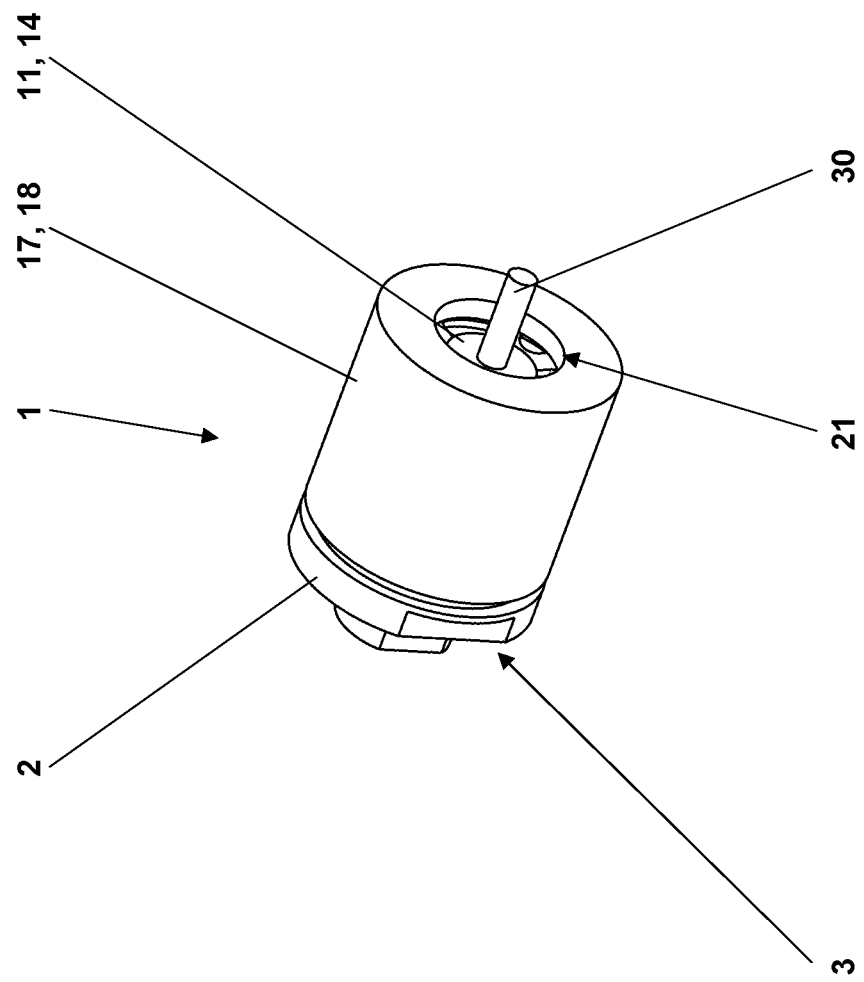
FIG. 3 is a perspective view of the apparatus according to the invention of FIGS. 1 and 2 in the assembled state according to FIG. 2, without the heating device.

The perspective view according to FIG. 3 shows the compact design of the apparatus 1. Another embodiment of the heating device for heating the release elements than depicted in FIG. 2 may be arranged around the screw cap 17 or integrated in the base 2 or the screw cap 17.

In testing the apparatus 1, the following products have successfully been used as rod-shaped release elements 7 in blind holes 6 having a by 10% larger diameter:
  a) Kellogg's Research Labs, part number: LOW-NITI-W-100-HT, description: high temperature 180° F. (80° C.), 0.1 cm (1.0 mm) Form Memory Nitinol Wire, 5 feet
  b) NEXMETAL.com, Nitinol SMA Muscle Wire Shape Memory Alloy (80° C. temperature, 1 mm diameter).

The collet chuck 10 used was adapted to the diameter of the pin 2. Suitable collet chucks are, for example offered here: https://www.hoffmann-group.com/US/en/hus/Clamping-technology/Toolholders/ER-collet-ER-11/p/308881

Many variations and modifications may be made to the preferred embodiments of the invention without departing substantially from the spirit and principles of the invention. All such modifications and variations are intended to be included herein within the scope of the present invention, as defined by the following claims.

I claim:

1. An apparatus for holding and releasing a pin in a controlled manner, the apparatus comprising
  a base,
  a pin holding element supported at the base,
  a plurality of rod-shaped release elements made of a shape memory alloy and supported at the base,
  a holding force application device supported at the base and configured for applying an elastic holding force, and
  a force transfer element,
  wherein the force transfer element is subjected to the elastic holding force applied by the holding force application device, and wherein the force transfer element, against the elastic holding force, is supported at the base via a parallel arrangement of the pin holding element and the rod-shaped release elements,
  wherein each of the rod-shaped release elements is arranged with radial play in a blind hole of a plurality of blind holes in the base, the plurality of blind holes being arranged around the pin holding element, and
  wherein the pin holding element is deactivatable by heating up the rod-shaped release elements beyond a transition temperature of their shape memory alloy and by a resulting recovery of the rod-shaped release elements to straight memory shapes.

2. The apparatus of claim 1, wherein the shape memory alloy has a one way memory effect.

3. The apparatus of claim 1, wherein the transition temperature of the shape memory alloy is at least 70° C.

4. The apparatus of claim 1, wherein a force transfer piece movably guided in the respective blind hole of the plurality of blind holes is arranged between the force transfer element and each of the rod-shaped release elements.

5. The apparatus of claim 1, wherein the blind holes are parallel to a central pin seat in the pin holding element.

6. The apparatus of claim 1, wherein the radial play is between 5% and 15% of a diameter of the rod-shaped release elements in total.

7. The apparatus of claim 1, wherein the rod-shaped release elements have a square or circular cross section, wherein a length of the rod-shaped release elements is between 4-times and 40-times a diameter of the rod-shaped release elements.

8. The apparatus of claim 1, wherein the pin holding element is a collet chuck with a central pin seat, wherein the collet chuck has an outer cone via which the collet chuck is supported at an inner cone of the base.

9. The apparatus of claim 8, wherein equal cone angles of the outer cone and the inner cone are in a range from 10° to 20°.

10. The apparatus of claim 1, wherein the holding force application device comprises a screw element having a screw thread engaging a counter-thread of the base.

11. The apparatus of claim 10, wherein a thread axis of the counter-thread is parallel to a central pin seat of the pin holding element.

12. The apparatus of claim 10, wherein the screw element is a screw cap screwed on the counter-thread of the base.

13. The apparatus of claim 12, wherein, wherein the screw cap has a central pin opening.

14. The apparatus of claim 1, wherein the holding force application device comprises a spring.

15. The apparatus of claim 14, wherein the spring comprises at least one clover-leaf-shaped cup spring.

16. The apparatus of claim 1 and further including a heating device for heating the release elements.

17. The apparatus of claim 16, wherein the heating device is configured to directly heat each of the release elements by directing an electrical current through the release elements.

18. The apparatus of claim 17, wherein the heating device has at least one of an AC/DC converter, a DC/DC converter and a storage capacitor.

19. The apparatus of claim 17, wherein electrical insulations are provided at outer circumferences of the rod-shaped release elements or at inner circumferences of the blind holes or both at outer circumferences of the rod-shaped release elements and inner circumference of the blind holes.

* * * * *